US012517772B2

(12) United States Patent
Rahman et al.

(10) Patent No.: US 12,517,772 B2
(45) Date of Patent: Jan. 6, 2026

(54) EVENT PROCESSING SYSTEMS AND METHODS

(71) Applicants: Atlassian Pty Ltd., Sydney (AU); Atlassian Inc., San Francisco, CA (US)

(72) Inventors: Saidur Rahman, Sydney (AU); Xinyang Zhang, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/854,937

(22) Filed: Jun. 30, 2022

(65) Prior Publication Data

US 2024/0004734 A1  Jan. 4, 2024

(51) Int. Cl.
G06F 9/54 (2006.01)

(52) U.S. Cl.
CPC .................. *G06F 9/546* (2013.01)

(58) Field of Classification Search
CPC .... G06F 9/5083; G06F 9/505; G06F 9/45558; G06F 9/546
USPC ....................................................... 707/740
See application file for complete search history.

(56) References Cited

U.S. PATENT DOCUMENTS

| 7,950,017 | B1* | 5/2011 | Cain ........................ G06F 9/546 |
| | | | 719/310 |
| 10,120,746 | B1* | 11/2018 | Sharifi Mehr ...... H04L 63/1425 |
| 2017/0272550 | A1* | 9/2017 | Rodriguez ............. G06Q 10/10 |
| 2020/0057946 | A1* | 2/2020 | Singaraju ............... G06N 5/022 |
| 2021/0314342 | A1* | 10/2021 | Oberg ...................... H04L 63/20 |
| 2021/0357397 | A1* | 11/2021 | Jha ....................... G06F 9/45558 |
| 2022/0121708 | A1* | 4/2022 | Burnett ............... G06F 16/9038 |

* cited by examiner

*Primary Examiner* — Hung T Vy
(74) *Attorney, Agent, or Firm* — Brownstein Hyatt Farber Schreck, LLP

(57) ABSTRACT

Systems and methods for processing event records are disclosed. The method includes receiving, at a server node, an event record. The event record includes an event type identifier. The method further includes selecting a message queue from a plurality of message queues for the event record based at least on the event type identifier of the event record, and communicating the event record to the selected message queue. A worker node associated with the selected message queue retrieves the event records, processes it and communicates the processed event record to a downstream service for consumption.

16 Claims, 3 Drawing Sheets

EVENT PROCESSING SYSTEMS AND METHODS

TECHNICAL FIELD

Aspects of the present disclosure are directed to event processing, and in particular, to improved techniques for reducing latency in processing events.

BACKGROUND

For website analytics, web clients often employ an analytics engine that monitors a user's interactions with web pages displayed by the website and triggers "events" based on these monitored interactions. For example, each time a user selects a particular interactive affordance an event may be triggered. Similarly, each time a user makes a comment, edits the webpage, or even scrolls content on the webpage an event may be triggered. The events typically identify the user and the particular action the user performed on the website. The analytics engine of each web client communicates these events to a backend server, which processes the events so that they can be used by downstream services, e.g., to personalize webpages for users, create targeted on-boarding experiences for users, and/or analyze the performance of the website.

However, a large website that hosts thousands if not hundreds of thousands of users on any given day, may fire millions of events daily and processing such a large number of events may be slow.

SUMMARY

Example embodiments described herein are directed to a computer-implemented method for processing event record. The computer-implemented method includes receiving, at a server node, an event record. The event record includes an event type identifier. The method further includes selecting a message queue from a plurality of message queues for the event record based at least on the event type identifier of the event record, and communicating the event record to the selected message queue. A worker node associated with the selected message queue retrieves the event records, processes it, and communicates the processed event record to a downstream service for consumption.

Other example embodiments described herein are directed to an event processing system for processing event records. The system includes a server node, a plurality of message queues, and a worker node associated with each of the plurality of message queues. The server node includes a first processing unit and a first non-transitory computer readable medium comprising instructions which when executed by the first processing unit cause the server node to: receive an event record, the event record including an event type identifier, select a message queue from the plurality of message queues for the event record based at least on the event type identifier of the event record; and communicate the event record to the selected message queue. The worker node associated with the selected message queue includes a second processing unit and a second non-transitory computer readable medium comprising instructions which when executed by the second processing unit cause the server node to process the event record and communicate the processed event record to a downstream service.

Some example embodiments are directed to non-transitory computer readable medium that comprises instructions which when executed by a processing unit cause a computer system to perform the method described above.

Figure 1:
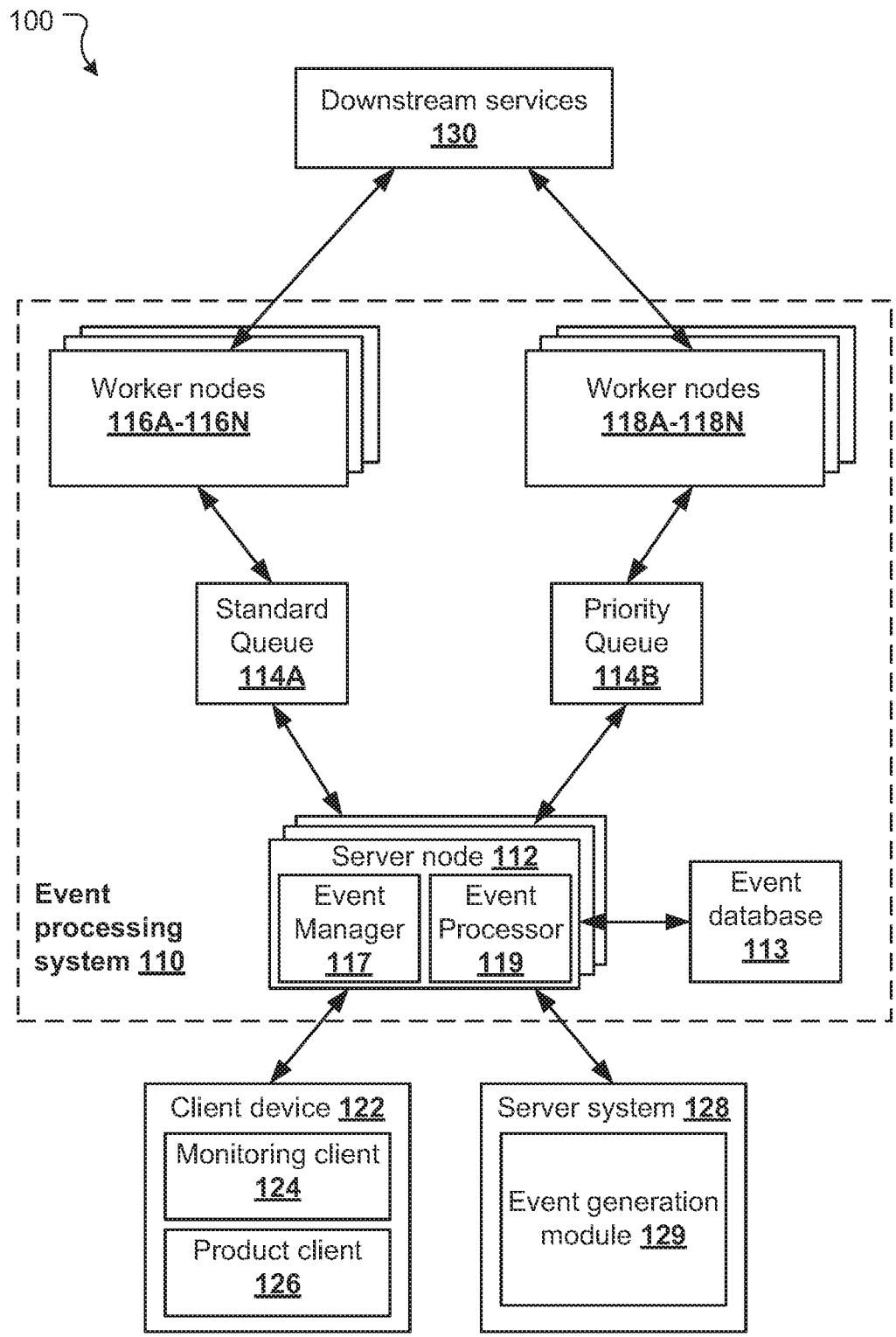
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the scope to the particular form disclosed. The intention is to cover all modifications, equivalents, and alternatives falling within the scope of the various embodiments described herein and as defined by the appended claims.

DETAILED DESCRIPTION

In the following description numerous specific details are set forth in order to provide a thorough understanding of various embodiments described in the present disclosure. It will be apparent, however, that the various embodiments described in the present disclosure may be practiced without these specific details. In some instances, well-known structures and devices are shown in block diagram form in order to avoid unnecessary obscuring.

Overview

As described previously, when a user interacts with a website/webpage, an event monitoring engine on the web client may monitor the user's interactions with the website/webpage and generate events.

Typically, these triggered events are communicated to the backend system for processing. In particular, once an event is received at the backend system, it is put in a queue along with other received events. Available worker nodes—that process events—retrieve events from the queue and process the events to be consumed by downstream services.

These processed events can be of various types, including e.g., behavioral events, operational events and trait/identity events. Behavioral events may indicate an action performed by a user. Examples include screen events that fire when a user navigates to a particular screen, tab, modal or dialog. These events enable analysis of the paths users take to perform specific tasks and can provide insight into where users stop engaging with a webpage. Other examples of behavioral events include UI events that fire when a user interacts with a user interface element such as a button, text field, or link. These events help systems to analyze how users perform certain tasks. Track events are a third type of behavioral events that fire when an actor successfully completes a product action such as creating an object, viewing a page, etc. Operational events are analytics events that fire when a user triggers an internal UI component event. These events may help measure usage or performance of implementation detail. These events are primarily not used to measure user actions, but rather help identify whether the webpage is functioning correctly. Trait/identity events, on the other hand, aid in tying a user to their actions and recording traits about the users. Identify events are fired by client devices but can also be triggered by backend systems doing some batch processing. A trait can broadly be considered a characteristic (or attribute) of an entity. For example, a trait event may identify when a user first signed up for an application or what the user's location was when they last logged into a computer application. Identify/trait events may indicate an inherent characteristic of an entity or user. For example, a trait event may include information about the user, the user device, user location, the web client, and/or which other applications the user is registered with, etc.

As many events may be processed in a day (e.g., close to millions or billions of events for large applications), depending on the availability of worker nodes, the time taken from capturing an event to pushing the event to downstream services may take a long time (e.g., hours).

This delay may be insignificant for some downstream services such as services that compute metrics related to performance of website/webpages based on behavior or operational events (as these metrics are usually computed at fixed time, e.g., daily, weekly, or even fortnightly). However, for other services, this delay in processing events may be significant. For instance, downstream services that personalize web pages or offer personalized on-boarding experiences based on trait events, may require event data as soon as possible to tailor user experiences. At the moment, however, all events are pushed to the same queue for processing and are then processed based on some queue order such as first-in-first-out (FIFO).

Accordingly, there is a desire to reduce this latency in processing at least some types of events so that they can be delivered to downstream services as soon as possible.

To do so, aspects of the present disclosure provide an improved event processing system and method that reduces the latency to process at least certain types of events. To this end, the event processing system and method includes multiple queues and their associated worker nodes. It also includes an event manager that is configured to assign an event to one of the multiple queues based on one or more factors (such as characteristics of the event determines the type of an event (e.g., by inspecting the payload or content of an event record) and then assigns the event to one of the multiple queues for processing.

In some embodiments, the system includes a priority queue and a standard queue. Upon inspecting the payload of an incoming event record, the manager determines whether to pass the event record to the priority queue or the standard queue. If the manager determines that the event record is supposed to be passed to the priority queue, it is added to the priority queue. Additionally, or alternatively, if the manager determines that the event record is supposed to be passed to the standard queue, it is added to the standard queue. In one example, the manager makes this determination based on identifying an event type of the event. If the manager determines that the event type is a trait event, it determines that the event is supposed to be passed to the priority queue. Otherwise, if the manager determines that the event type is an action event, it passes the event to the standard queue.

In another example, the manager makes this determination based on a priority type and event type of the event. If the manager determines that the event type is a trait event and the priority level is high, it may determine that the event is supposed to be passed to the priority queue. Events having other event events or priority levels may be passed to the standard queue.

In this manner, trait events (having high priority in some cases) may be segregated from action events and processed using dedicated worker nodes for trait events whereas all other events may be processed by the standard queue and its corresponding worker nodes. This way, trait events and/or high priority events can be processed out of turn by their own dedicated worker nodes which reduces the latency of processing such events and makes such events available to downstream services much quicker.

These and other aspects of the present disclosure will be described in detail in the following sections.

Example System

FIG. 1 depicts one example of a networked environment 100 in which the operations and techniques described herein can be performed. The environment 100 includes an event processing system 110 between one or more input devices 120 and one or more downstream services 130.

Generally speaking, the input devices 120 communicate event records to the event processing system 110, which processes the received event records and communicates processed event records to the one or more downstream services 130.

The input device 120 may be a client device 122 that generates event records based on monitored user activity on the client device 122 and communicates it to the event processing system 110. Additionally, or alternatively, the input device 120 may be another computer application/service server 128, e.g., an analytics server or a product application server that generates event records and communicates these records to the event processing system 102.

When the input device is a client device 122, it may be any suitable electronic device, for example a mobile device (e.g., a tablet or mobile phone), a portable device (such as laptop computer), or any other computing device (e.g., a desktop computer).

Further, each client device 122 includes one or more client (software) applications (e.g., monitoring client 124) that are configured to monitor user interaction with content provided by a software application. The monitoring client 124 includes instructions and data stored in the memory (e.g., non-transient computer readable media) of the client device 122 on which the application is installed/run. These instructions are executed by a processor of the client device 122 to perform various functions as described herein. By way of example, some functions performed by the monitoring client 124 include monitoring user activity, generating one or more trait events, and communicating the generated events to the event processing system 110.

In addition to a monitoring client 124 that monitors user activity, the client device 122 may further include one or more product clients 126 configured to access software applications made available by product application server systems (e.g., server system 128). In this case, the product clients 126 may communicate with applications hosted by the server system 128, render user interfaces based on instructions received from those applications, and receive inputs from user accounts allowing them to interact with the applications hosted by the server system 128.

The product client 126 may be implemented in various ways. For example, the product client 126 may be web browser application (such as, for example, Chrome, Safari, Internet Explorer, Opera) which accesses the applications hosted by the server system 128 via appropriate uniform resource locators (URL) and communicates with these systems via general world-wide-web protocols (e.g., HTTP, HTTPS, FTP). In this case, the web browser application is configured to request, render, and display user interfaces that conform to a markup language such as HTML, XML or extensions, and may be capable of internally executing browser-executable code such as JAVASCRIPT, or other forms of code. Additionally, or alternatively, the product client 126 may be specific applications programmed to communicate with the server system 128 using defined application programming interface (API) calls.

The monitoring client 124 may be an add-on application of the product client 126—e.g., it may be a library or widget that is activated when the product client 126 is executing on the client device 122.

When the input device 120 is the server system 128, it may include an event generation module 129 that is configured to generate events whenever event triggering actions are performed by the server system 128 and communicates these to the event processing system 110. Event triggering actions may include the creation of a new object, saving changes to an existing object or deleting an object.

In order to process the event records received from the input devices 120, the event processing system 110 includes one or more server nodes 112, two or more queues (e.g., priority queue 114A and standard queue 114B), and one or more worker nodes (e.g., worker nodes 116A-N and 118A-N) associated with each of the two or more queues. A server node 112 is an instance of an event processing application and may execute on one or more computer or hardware resources (as shown and described with reference to FIG. 2).

Further, the server node 112 may provide an endpoint for other server systems 128 or client applications 124. To do so, the server node 112 may include one or more application programs, libraries, APIs or other software elements that implement the features and functions that are described herein.

In one example, the server application running on the server node 112 may be an analytics application that receives and processes event records and communicates processed event records to downstream services 130. In this example, the analytics application may receive such event records from one or more server systems 128, and/or directly from one or more client devices 122.

In one example, the server node 112 includes an event manager 117. The event manager 117 is configured to receive event records from the input devices 120 and for each received event record, the event manager 117 is configured to determine which queue 114 to communicate the event record to.

As described previously, the event manager 117 may inspect the event record payload to make this determination. In one example, the event manager 117 inspects the payload to determine the event type of the record. In another example, it inspects the payload to determine the priority level of the event record. In still another example, it inspects the payload to determine the event type and priority level of the event record. Then based on this determined information about the event record, the event manager 117 may select a queue 114 to process the record.

In addition to the event manager 117, the server node 112 includes an event processor 119. The event processor 119 may be configured to validate received event records and pass validated records to the event manager 117. In some examples, during validation, the event processor 119 is configured to determine whether a given event record conforms to a record template/schema. If the record does not conform to the template/schema, i.e., it does not include required fields, the event processor 119 may attempt to confirm the record to the template or determine that the event record is invalid and may discard the event record.

Additionally, or alternatively, if the record conforms to the template/schema, the event processor 119 determines that the event record is valid and passes the record to the event manager 117.

In addition to validating event records, the event processor 119 may also be configured to enrich event records— e.g., by adding additional fields to the records. In one example, the event processor 119 may add client application type and client device operating system type to the event record. Further, the event processor may add the country and state of the input device by parsing this information from the IP address of the input device received as part of the event record.

Worker nodes 116 and 118 may be similar to server nodes 112, the major difference being that worker nodes 116, 118 are configured to perform background jobs such as process event records and communicate these to downstream services 130 whereas the server nodes 112 are configured to handle event records received from input devices 120. Accordingly, each worker node 116, 118 may also be an instance of a server application and may execute on a computer or hardware resource (as shown and described with reference to FIG. 2).

In some examples, the worker nodes 116, 118 are created from the same configuration file used to create server nodes 112. In such cases, the worker nodes 116, 118 essentially have the same modules/programs as the server nodes 112. In other examples, worker nodes may be configured differently. For example, a worker node 116, 118 may utilize a different compute instance, meaning that other parameters such as the number of active worker nodes polling the various queues may vary).

The priority and standard queues 114A and 114B are message queues that store messages until they are processed and deleted. Each message in a message queue is generally processed only once, by a single consumer or worker node. In the present environment, the queues 114A, 114B can be accessed by any of the worker nodes associated with that corresponding queue. That is, the priority queue 114A is accessible by worker nodes 116A-N and the standard queue 114B is accessible by worker nodes 118A-N.

The event manager 117 posts event records (in the form of messages or jobs) either to the priority or standard queue 114A or 114B. Messages posted to the priority queue 114A are processed by any available worker node from the group 116A-116N, whereas messages posted to the standard queue 114B are processed by any available worker node 118 from the group 116A-116N. Any available worker node associated with a given queue may retrieve a pending message (in some sort of order maintained by the queue) from its associated queue and execute the message as per the requirements of that message. Once the message is executed, the corresponding message is deleted from the queue 114 and the worker node can retrieve another message from the queue to execute. A non-limiting example of the priority or standard queue includes the Simple Queue Service (SQS) offered by Amazon.

In addition to these components, the event processing system 110 may further include an event database 113 that stores information about the various types of events managed by the event processing system 110. For instance, user may create one or more event types along with their trigger conditions and save these event types. Whenever the trigger condition associated with an event type is detected, e.g., by the monitoring client, an event record for that event type is generated. The event database may store metadata associated with the event types, e.g., event name, event identifier, event creator, owner, trigger condition, related product, etc. In addition, the event database 113 may store schema information for the stored events—e.g., the required format/fields for any given event type.

It will be appreciated that although the system 110 of FIG. 1 is depicted with multiple server nodes 112, worker nodes 116, and queues 114, this need not be the case. In some cases, the event processing system 110 may include a single server node 112, two queues 114 and one worker node per queue. Further still, the event processing system 110 can be dynamically scalable. That is, the number of server nodes 112 and worker nodes 116, 118 employed in the system 110 may vary over time, e.g., based on demand. During busy times, more server and worker nodes may be provisioned and during low traffic periods some server and/or worker nodes may be decommissioned such that fewer server and worker nodes are executing. In some implementations, the provisioning and decommissioning of the nodes may be done automatically based on predetermined demand patterns, real-time demand, and/or based on any other such network parameters.

In some examples, although the number of nodes may be scalable, the number of queues may remain the same. That is, as a minimum, the system may include two queues—a priority queue 114A and a standard queue 116A. In other examples, the number of queues may also vary. That is, the system may employ two or more queues depending on the latency required and the type of event records processed by the system. For example, the system may add a third queue for event records related to a particular type of event records (e.g., track events) or a particular priority level (e.g., priority level 3).

The downstream services 130 may be any services/applications that utilize event records. In one example, a downstream service 130 may be a website analytics system that utilizes the action events to determine the performance of the computer application hosted by the server system 128 and/or the webpages displayed by the product client 126. In another example, the downstream service 130 may be a personalization engine that creates on-boarding experiences for users based on trait events received from the event processing system 110.

In yet another example, the downstream service 130 may be an events platform (not shown) that is designed based on a publish-subscribe model. That is, the event processing system 110 sends event records to the event platform and consumers (such as the website analytics system or the personalization engine) subscribe to the event platform to receive certain types of event data from the event platform. In this model, the publisher categorizes the event data into classes without knowledge of which subscribers there may be. Similarly, subscribers express interest in one or more classes of event data and receive event data from the event platform that is of interest to them. For example, the personalization engine may subscribe to receive trait events related to one or more computer applications. Similarly, the analytics system may subscribe to receive action events related to one or more computer applications. When the event platform receives an event record, the event platform matches the event record with the subscribers who are subscribed to that event and makes a copy of the event data for each subscriber and stores a copy in the subscriber's queue or stream. StreamHub® offered by Atlassian, Inc. is one example of such an event platform.

The techniques and operations described herein are performed by one or more computer processing systems. By way of example, one or more server nodes 112 may be executed on a computer processing system which is configured (or configurable) by hardware and/or software to offer server node functionality. Similarly, one or more worker nodes 116, 118 may be executed on a computer processing system which is configured to offer worker node functionality. Similarly, the other components of the event processing system 110, such as the queues 114 may be provided by way of a computer processing system.

Figure 2:
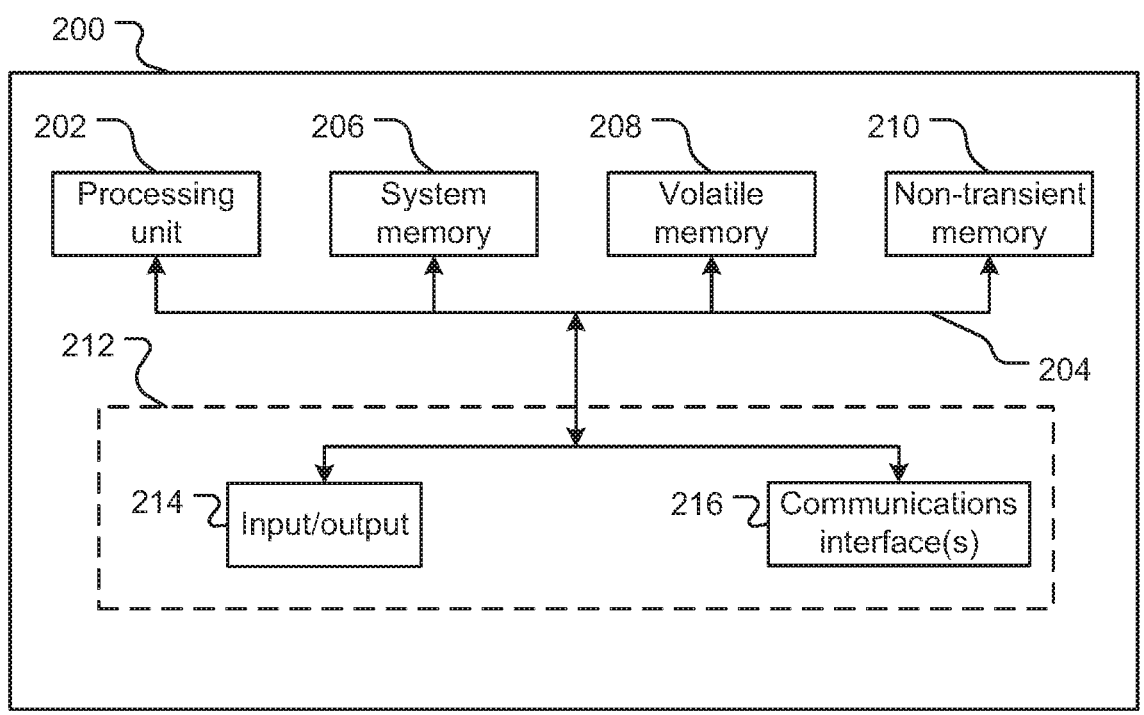
FIG. 2 is a block diagram of a computer processing system configurable to perform various features of the present disclosure.

FIG. 2 provides a block diagram of a computer processing system 200 configurable to implement embodiments and/or features described herein. It will be appreciated that FIG. 2 does not illustrate all functional or physical components of the computer processing system 200. For example, no power supply or power supply interface has been depicted, however the system 200 can either carry a power supply or be configured for connection to a power supply (or both). It will also be appreciated that the particular type of computer processing system can determine the appropriate hardware and architecture, and alternative computer processing systems suitable for implementing features of the present disclosure may have additional, alternative, or fewer components than those depicted.

The computer processing system 200 includes at least one processing unit 202. The processing unit 202 may be a single computer processing device (e.g., a central processing unit, graphics processing unit, or other computational device), or may include a plurality of computer processing devices. In some instances, where a computer processing system 200 is described as performing an operation or function, all processing required to perform that operation or function is performed by the processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store computer readable instructions and/or data which are executed by the processing unit 202 to control operation of the computer processing system 200. In this example, the computer processing system 200 includes a main memory which in turn may include a system memory 206 (e.g., a BIOS), a volatile memory 208 (e.g., random access memory such as one or more DRAM modules), and a non-transient memory 210 (e.g., one or more hard disk or solid state drives).

The computer processing system 200 also includes one or more interfaces, indicated generally by 212, via which system 200 interfaces with various devices and/or networks. Generally speaking, other devices may be integral with the computer processing system 200, or may be separate. Where a device is separate from the computer processing system 200, connection between the device and the computer processing system 200 may be via wired or wireless hardware and communication protocols, and may be a direct or an indirect (e.g., networked) connection.

Wired connection with other devices/networks may be by any appropriate standard or proprietary hardware and connectivity protocols. For example, the computer processing system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, the computer processing system 200 may be configured for wireless connection with other devices/communications networks using one or more of: Bluetooth; Wi-Fi; near field communications (NFC); Global System for Mobile Communications (GSM), and/or other wireless connections.

Generally speaking, and depending on the particular system in question, devices to which the computer processing system 200 connects—whether by wired or wireless means—include input/output devices 214 that may include one or more input devices to allow data to be input into/received by the computer processing system 200 and one or more output device to allow data to be output by the computer processing system 200.

The computer processing system 200 also includes one or more communications interfaces 216 for communication with a network (e.g., Internet and/or a local network). Via the communications interface(s) 216, the computer processing system 200 can communicate data to and receive data from networked systems and/or devices.

The computer processing system 200 may be any suitable computer processing system, for example, a server computer system, or a client computer system such as a desktop computer, a laptop computer, a netbook computer, a tablet computing device, a mobile/smart phone, a personal digital assistant, or an alternative computer processing system.

The computer processing system 200 stores or has access to computer applications (also referred to as software or programs)—i.e., computer readable instructions and data which, when executed by the processing unit 202, configure the computer processing system 200 to receive, process, and output data. Instructions and data can be stored on non-transient machine readable medium accessible to the computer processing system 200. Instructions and data may be transmitted to/received by the computer processing system 200 via a data signal in a transmission channel enabled (for example) by a wired or wireless network connection over an interface such as, the communications interface 216.

Typically, one application accessible to the computer processing system 200 is an operating system application. In addition, the computer processing system 200 may store or have access to applications which, when executed by the processing unit 202, configure the computer processing system 200 to perform various computer-implemented processing operations described herein. For example, and referring to the networked environment of FIG. 1 above, the server node 112 includes one or more systems which run the event manager 117 and the event processor 119.

In some cases, part or all of a given computer-implemented method will be performed by the computer processing system 200 itself, while in other cases processing may be performed by other devices in data communication with the computer processing system 200.

Example Methods

Figure 3:
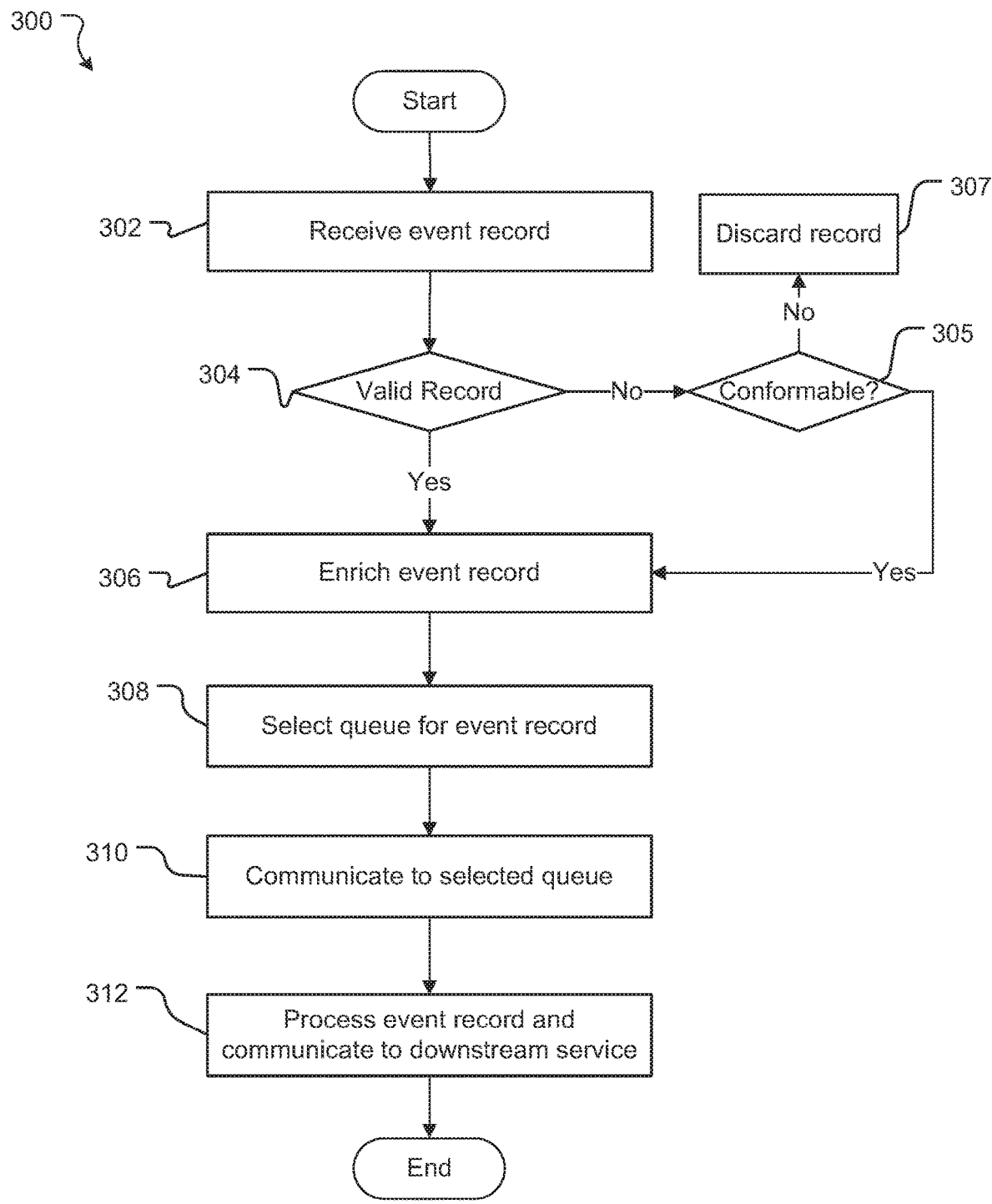
FIG. 3 is a flowchart depicting an example method for processing an event record according to aspects of the present disclosure.

FIG. 3 is a flowchart illustrating an example method 300 for processing an event record according to aspects of the present disclosure. It will be appreciated that this method 300 is described with reference to a single event record. However, it will be appreciated that in operation, this method is performed for each event record received by the event processing system 110.

At step 302, the event processing system 110 and in particular an available server node 112 receives an event record. The event record may be received from a client device 122. In this case, the monitoring client 124 on the client device 122 monitors user activity on the client device 122 while the user is interacting with a webpage displayed by the product client 126. The monitoring client 124 then detects one or more event triggering activities. For example, the monitoring client 124 may detect the first time the user opens a webpage, or when the user performs an action, such as selecting an affordance, writing a comment, opening a new webpage, etc. Whenever the monitoring client 124 detects one or more of these event triggering activities, it generates an event record. The event record may include information about the event type, e.g., whether it is a trait/identity event, behavior event or operational event. Further still, the event record may include information about the user (e.g., user ID) and information about the client device (e.g., IP address, product client type, operating system, etc.) For example, a trait event includes information such as the user location, the user device screen dimensions, libraries installed in the web browser, type of event, user ID, traits (e.g., user ID type), message, metadata, etc. A behavior event includes information such as event type, product ID, version, and information about the type of behavior event and the product, webpage, affordance, etc, associated with the behavior event. Similar data may be included in an operational event.

Once the event record is generated by the monitoring client 124, it is communicated to the event processing system 110.

Additionally, or alternatively, the event record may be received from a server system 128 hosting a computer application. In this case, the server system 128, and in particular the event generation module 129 may trigger event generation whenever it detects one or more triggering activities. For instance, if the server system 128 is for an issue tracking system such as Jira, event generation may be triggered each time a new issue is created. Whenever the product server detects one or more of these event triggering activities, it generates an event record. The event record may be similar to the event records generated by clients. Further still, the event record may include information about the computer application that created the event, and information about the object on which the event occurred (e.g., the object ID). Once the event record is generated by the monitoring client 124, it is communicated to the event processing system 110.

At step 304, the server node 112 and in particular the event processor 119 determines whether the event record is valid. In one example, this determination includes checking whether the event record conforms to the schema/template for the event record. To this end, the server node 112 may have access to an event registry or lookup table that includes information about the required fields for each event type. It may inspect the event type of the record (e.g., by inspecting the payload of the event record) and may perform a lookup with this event type in the event registry to retrieve the fields required for that event type. For instance, if the event record has a tracking event type, the server node 112 may check whether the event record includes information about the tracked object (such as the object ID, container ID, project ID, etc.). Similarly, if the event record has a trait event type, the server node 112 may determine whether the event record includes user information and/or client device information If the server node 112 determines that the event record includes all the required information for that event type, the event record is validated at step 304 and the method proceeds to step 306. Additionally, or alternatively, if the server node 112 determines that the event record does not include all the required information for that event type and/or the event record does not conform to the schema for that event record, the method proceeds to step 305 where the server node determines whether it can conform the event record to the schema. For example, if the event record is missing one or more required fields, the server node 112 may determine whether it can add default values for those fields and add the fields to the event record. If the server node 112 is successful in conforming the record to the schema for that type of event record, the method proceeds to step 306. Additionally, or alternatively, if it is not possible to add the missing information or if it is not possible to convert the format of the event record to the required schema, the event record may be discarded at step 307 and the method 300 ends.

At step 306, once the record is validated, the event processor 119 may enrich the event record. Enriching involves adding additional information to the event record to make the record more useful to downstream services. In some embodiments, events may be enriched by adding additional fields to the events. For example, the server node 112 may add information about the product client 126 and the operating system of the client device 122 that generated the event record to the event record. This may be done, for example, by parsing the userAgent field of an event record (which may include, e.g., Mozilla/5.0 (Macintosh; Intel Mac OS X 10_15_7) AppleWebKit/537.36 (KHTML) Chrome/102.0.0.0 Safari/537.36". In another example, the server node may add location information such as the country and state of the client device 122. This information may be determined for example by parsing the IPAddress field of the event record.

Further still, the event record may be enriched by adding the priority of the event at this step. In some examples, the event processing system 110 maintains an event database 113 that stores information about different types of events. The stored information includes metadata related to events and metrics. At step 306, the server node 112 retrieves metadata of the received event from the event database 113. In one example, this may be done by performing a lookup in the event database 113 using the name or identifier of the event received in the event record. In one example, the database provides metadata related to the event as shown in table A below. The metadata may include amongst other information such as event name, ID, owner, etc, the priority of the event. In the example shown in table A, the event has a STANDARD priority.

TABLE A example metadata information for an event record

```
{
    "values": [
        {
            "id": 5,
            "name": "hello-world",
            "description": "",
            "owner": "jshi",
            "entityType": "ORG",
            "traitType": "STRING",
            "tier": "INITIATIVE",
            "status": "ACTIVE",
            "priority": "STANDARD",
            "category": "ORDINARY"
        },
```

In another example, the server node 112 may periodically poll the event database 113 to retrieve the metadata for all the events maintained by the database. If the server node 112 already has a copy of the database, it may check the database for changes periodically and retrieve the metadata if it determines that the data maintained by the database has changed since it was last retrieved. By periodically polling the database and maintaining a local copy of the event information at the server node, the node 112 does not need to communicate with the database every time it receives an event record and may save significant processing time.

Next, at step 308, the event processor 119 passes the validated and optionally enriched event record to the event manager 117. The event manager 117 then selects a queue to pass the event record to.

As described previously, the event manager 117 may be programmed to make this determination based on one or more factors. In some embodiments, the event manager 117 may be configured to inspect the enriched event record payload and select a queue based on the values of one or more fields of the event record. For example, the event manager 117 may select a queue from the priority queue 114A and the standard queue 114B based on the event type. For example, it may select the priority queue 114A for trait events and select the standard queue 114B for all other types of events. In another embodiment, the event manager 117 may be configured to inspect the event priority field and select a queue from the priority queue 114A and the standard queue 11B based on the event priority. For example, it may select the priority queue 114A for events with high priority levels (e.g., important, or level 5) and select the standard queue 114B for events with all other priority levels (e.g., standard, or level 2). In yet another embodiment, the event manager 117 may be configured to inspect the event type and event priority fields and select a queue from the priority queue 114A and the standard queue 11B based on both these fields. For example, it may select the priority queue for events with high priority levels and select the standard queue 114B for events with all other priority levels.

In still other embodiments, the event manager 117 may be programmed to select a queue based on other external factors such as number of records currently present in all active queues, time of day, etc. For example, if more than a threshold number of records are present in the standard queue and less than another threshold number of records are present in the priority queue and it is a particular time of the day (e.g., between 3-5 AM), the event manager 117 may be configured to push event records to either queue irrespective of the event type or priority level. This may be done, e.g., at times when the system does not expect to receive a large number of trait and/or high priority events, to utilize the active queues and worker nodes more uniformly.

Once a queue is selected, the method proceeds to step 310 where the event record is communicated to the selected queue. It is then saved in the queue as a message waiting to be actioned by the next available worker node associated with the selected queue when the message is at the head of the queue.

At step 312, the event record is processed. As described previously, the queue may be a first-in-first-out queue which processes messages in the order in which they were queued. So, a message added to the queue at a first time is processed before a message added to the queue at a second time. When the event record received at step 302 is at the head of the selected queue, an available worker node associated with the selected queue actions the event record. For instance, if the selected queue is the priority queue 114A, then when the event record is at the head of the priority queue, an available worker node from the worker nodes 116A-116N, marks the event record so that other worker nodes do not also try to process the same event record.

Once the worker node processes the event record, it communicates the event record to a downstream service 130 and communicates a confirmation message to the queue. Based on the confirmation message, the event record is deleted from the queue. In one example, the worker node may receive confirmation from the downstream service that it has received the communicated event without any errors. Once the worker node receives such a confirmation, it communicates the confirmation message to the queue and the event record is deleted from the queue.

Accordingly, by employing an event manager and a plurality of queues, the event processing system can direct event records to one of the plurality of queues depending on the latency requirements for the event record. Events that need to be processed quickly (e.g., trait events and/or high priority events) and be made available to downstream services 130 as soon as possible may be directed to the priority queue whereas events that are not significantly affected by higher processing times may be directed to the standard queue.

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including," "includes," "comprising," "comprises," "comprised," and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

What is claimed is:

1. A computer-implemented method comprising:
   receiving, at a server node, an event record, the event record generated in response to a user interaction with a client application operating on a client device;
   assigning, by the server node, a priority level to the event record based on a type of interaction with the client application causing the event record;
   selecting a message queue from a plurality of message queues for the event record based at least on the priority level, each message queue having a respective priority level for processing event records, wherein the system is configured to process a higher priority level event record before a lower priority level event record;
   communicating the event record to the selected message queue; and
   causing processing, by a worker node associated with the selected message queue, the event record and communicating to a downstream service for consumption, wherein a worker node processing event records in a high priority queue is different than a worker node processing event records in a low priority queue.

2. The computer-implemented method of claim 1, wherein the type of interaction causing the event record indicates whether the event record is for a trait event, a behavior event, or an operational event.

3. The computer-implemented method of claim 2, wherein:
   the plurality of messages queues include a priority queue and a standard queue;
   the server node selects the priority queue upon determining that the type of interaction causing the event record indicates that the event record is for the trait event; and
   the server node selects the standard queue upon determining that the type of interaction causing the event record indicates that the event record is for the behavior event or the operational event.

4. The computer-implemented method of claim 1, further comprising:
   retrieving the priority of the event record from an event database; and
   adding the retrieved priority to the event record.

5. The computer-implemented method of claim 1, wherein the selecting the message queue for the event record includes selecting the message queue based on one or more external factors.

6. The computer-implemented method of claim 5, wherein the one or more external factors include time of day or number of event records present in the plurality of message queues.

7. The computer-implemented method of claim 1, further comprising:
   determining whether the event record is valid; and
   discarding the event record upon determining that the event record is invalid.

8. The computer-implemented method of claim 1, further comprising enriching the event record, wherein enriching the event record includes at least one of:
   adding a priority field to the event record that indicates the priority of the event record;
   adding information about an operating system of a client device on which the event record was generated; or
   adding location information of the client device on which the event record was generated.

9. An event processing system, comprising:
   a server node;
   a plurality of message queues; and
   a worker node associated with each of the plurality of message queues;
   wherein:
      the server node comprises a first processing unit and a first non-transitory computer readable medium comprising instructions which when executed by the first processing unit cause the server node to:
         receive an event record, the event record generated in response to a user interaction with a client application operating on a client device;
         assign, by the server node, a priority level to the event record based on a type of interaction with the client application causing the event record;
         select a message queue from the plurality of message queues for the event record based at least on the priority level, each message queue having a respective priority level for processing event records, wherein the system is configured to process a higher priority level event record before a lower priority level record; and communicate the event record to the selected message queue; and the worker node associated with the selected message queue comprises a second processing unit and a second non-transitory computer readable medium comprising instructions which when executed by the second processing unit cause the worker node to:

process the event record, wherein a worker node processing event records in a high priority queue is different than a worker node processing event records in a low priority queue; and communicate the processed event record to a downstream service for consumption.

10. The event processing system of claim 9, wherein the type of interaction causing the event record indicates whether the event record is for a trait event, a behavior event, or an operational event.

11. The event processing system of claim 10, wherein:

the plurality of messages queues include a priority queue and a standard queue;

the server node selects the priority queue upon determining that the type of interaction causing of the event record indicates that the event record is for the trait event; and the server node selects the standard queue upon determining that the type of interaction causing the event record indicates that the event record is for the behavior event or the operational event.

12. The event processing system of claim 9, wherein the first non-transitory computer readable medium further comprising instructions which when executed by the first processing unit cause the server node to:

retrieve the priority of the event record from an event database; and add the retrieved priority to the event record.

13. The event processing system of claim 9, wherein the selecting the message queue for the event record includes selecting the message queue based on one or more external factors.

14. The event processing system of claim 13, wherein the one or more external factors include time of day or number of event records present in the plurality of message queues.

15. The event processing system of claim 9, wherein the first non-transitory computer readable medium further comprising instructions which when executed by the first processing unit cause the server node to:

determine whether the event record is valid; and discard the event record upon determining that the event record is invalid.

16. The event processing system of claim 9, wherein the first non-transitory computer readable medium further comprising instructions which when executed by the first processing unit cause the server node to enrich the event record, wherein enriching the event record includes at least one of:

adding a priority field to the event record that indicates the priority of the event record;

adding information about an operating system of a client device on which the event record was generated; or adding location information of the client device on which the event record was generated.

* * * * *